UNITED STATES PATENT OFFICE.

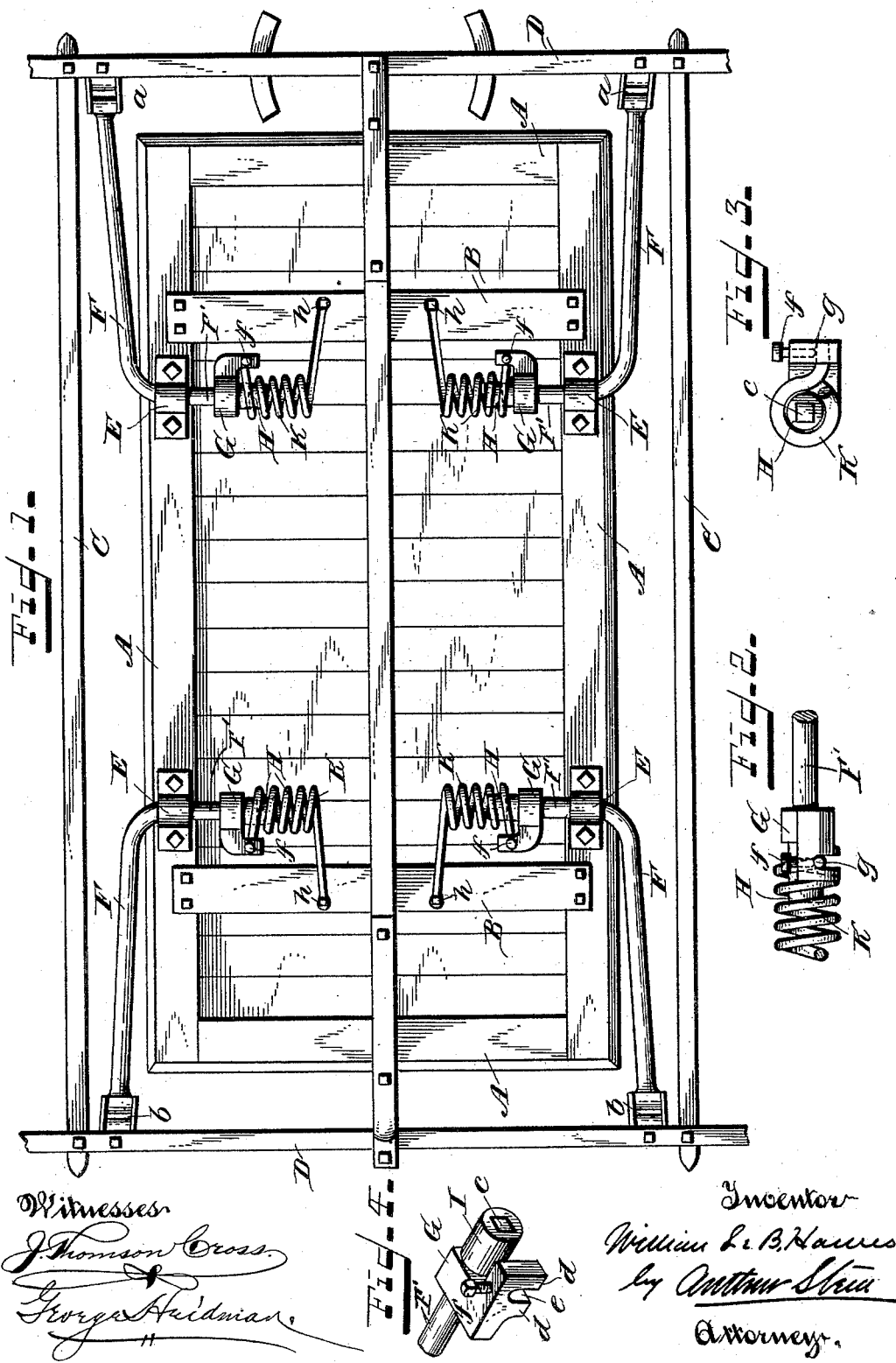

WILLIAM LE B. HAWES, OF CINCINNATI, OHIO.

VEHICLE-SPRING.

SPECIFICATION forming part of Letters Patent No. 464,967, dated December 15, 1891.

Application filed April 10, 1891. Serial No. 388,367. (No model.)

*To all whom it may concern:*

Be it known that I, WILLIAM LE B. HAWES, a citizen of the United States, residing at Cincinnati, in the county of Hamilton and State of Ohio, have invented a certain new and useful Improvement in Vehicle-Springs, of which the following is a full, clear, and exact description, reference being had to the accompanying drawings, forming part of this specification.

My invention relates to an improvement in springs for vehicles; and it consists of a novel construction and arrangement of parts to be hereinafter more particularly pointed out and claimed.

The object of my invention is to provide an improved spring for vehicles, which shall be exceedingly simple and durable in its construction, of small cost to manufacture, and which can be readily and easily attached to vehicles of various sizes.

The parts which make up the finished vehicle are often manufactured as separate articles of manufacture to be afterward put together in the finished wagon at the carriage-factory. This has resulted in the demand for many of the parts as separate articles of manufacture, and this demand has arisen for the various parts of the running-gear. My invention is directed to the filling of this want for a suitable vehicle-spring which can be readily adapted to any width of vehicle. The readiness with which such a spring can be applied to the vehicle is a matter of some importance, for vehicle-bodies requiring the same character of spring often vary several inches in width, so that one of the essentials of the successful vehicle-spring as a separate article of manufacture is that it can be easily and quickly applied to these varying widths of vehicles.

Vehicle-springs which may resemble my invention very closely in external appearance, I am aware, have been long in use; but all such springs that I am acquainted with are lacking in these essential requisites of my invention, to be hereinafter pointed out, which renders my springs simple and economical in construction and easily and readily applicable to all sorts and conditions of vehicles.

In the drawings, Figure 1 is a plan view of the bottom of the vehicle with my springs attached. Fig. 2 is a side view of one of the springs. Fig. 3 is an end view of same, and Fig. 4 a detail view, in perspective, of the connecting device between the spring and arm.

A A is the frame-work, forming part of the wagon-bed, provided with cross-braces B B, the wagon-body being supported in the support-frame made up of side sills C C and front and rear sills D D.

On the side frame A A of the wagon-bed are secured the four journal-boxes E E E E, in which are journaled the supporting-arms F F F F, upon which the vehicle-body is hung. These arms (preferably round) are secured by clips $a\ a$ to the head-block and by clips $b\ b$ to the rear axle in the usual way, and have their inner ends F bent inward to pass through the journal-boxes E E, and extending only a short distance beneath the body of the vehicle. These journal-boxes are preferably made wide in order to form a proper journal-bearing for the arms; or two journal-boxes of the usual width may be used side by side. Upon the inner end of these arms F F are secured the connecting-heads G G, preferably made of malleable iron and removably but rigidly secured to the ends F' of the arms in any convenient way, preferably by fitting the squared ends of the arms $c$ through the square opening in the connecting-head. These connecting-heads are constructed with two projecting jaws $d\ d$, forming between them a slot $e$ to receive and retain from lateral displacement the end of the coiled spring K. A set-screw $f$ is passed through the head-block and engages the end of the spring to vary its tension. The length of the slot permits the adjustment of the spring without moving its end beyond the walls of the slot, so that the end of the spring will always be secure from dislocation by sudden lateral movements of the vehicle. The inner portions of these heads G are extended inward to form the cylindrical bosses H H, while the end of the coiled springs K K fit between the jaws $d\ d$ within the slot $e$ of the heads, and the coils of the spring find a bearing around these cylindrical bosses. The cylindrical bosses are long enough to support several coils of the spring and form an ample bearing therefor. The other end of the coiled springs are securely bolted to the cross-braces B B at $h$ in the usual manner. When the vehicle-body is hung on the arms, the position of the body may be readily adjusted by means of the set-screws in the usual way.

I am well aware that the use of coiled springs acting on the arms, one spring for each of the four corners of the vehicle, is old, and that it has been the custom to use set-screws in connection with such springs in order to adjust the vehicle-body. In some of these constructions the coiled springs are a part of and integral with the supporting-arms; but in this construction the connection between the straight and spiral portion of the spring is often very weak, owing to the strain put upon the metal at the point when the coil begins, while the cost of manufacture is considerable, owing to the expensive machinery required to bend the metal, and the spring and arm, being of one piece, must be of the same size, although the proper size for the spring is not the proper size for the arm. Another old construction is to connect the opposing arms by a coupling-block, so as to form the two into practically one bar with two side supporting-arms, and to apply the coiled springs to these bars, four springs in all, two for each bar. Such construction, however, is manifestly not applicable to a vehicle-spring which is intended as a separate article of manufacture. The width of the vehicles varying as they do, such form of running-gear has to be manufactured especially for the vehicles upon which it is to be applied. Still another old construction consists in providing, in addition to the outer journal-box, a central inner bearing for each arm on the central longitudinal brace of the wagon-bed and then coiling the spring on the arm in the usual way. Such form is more expensive to manufacture, owing to the extra central bearings required, and the same objections as to fitting the spring and its connections to the varying widths of vehicles arises as in the last-mentioned construction. The lengths of the arms have to be proportioned to the distance between the side frame and central brace of the wagon-bottom. In my novel construction all these difficulties are overcome.

It will readily be seen that in constructing the inwardly-bent ends of the supporting-arms so that they extend only a short distance beneath the body of the vehicle the springs can be used on vehicles of varying widths. No central bearing is required, as the bosses on the connecting-heads form sufficient bearing-surface for the springs, while the arms, springs, and connecting-heads can all be made separately, and the parts are so simple that they can be made by the common blacksmith in his shop, and the end of the coiled spring can be readily secured to the cross-brace wherever it happens to be necessary.

Having thus described my invention, what I claim, and desire to secure by Letters Patent, is—

A support for vehicle-bodies, comprising the arms F, each having the inwardly-bent end F', a head G, having a seat for one end of a coiled spring, and a boss H, removably and independently secured on the extremity of the part F', the coiled spring K, surrounding said boss, and means for attaching said spring and arm to the vehicle, substantially in the manner shown and described.

WILLIAM LE B. HAWES.

Witnesses:
 E. J. HESS,
 ALFRED M. ALLEN.